May 27, 1952  J. A. LOVE  2,598,400
LIFT TYPE DISK HARROW
Filed Aug. 20, 1948
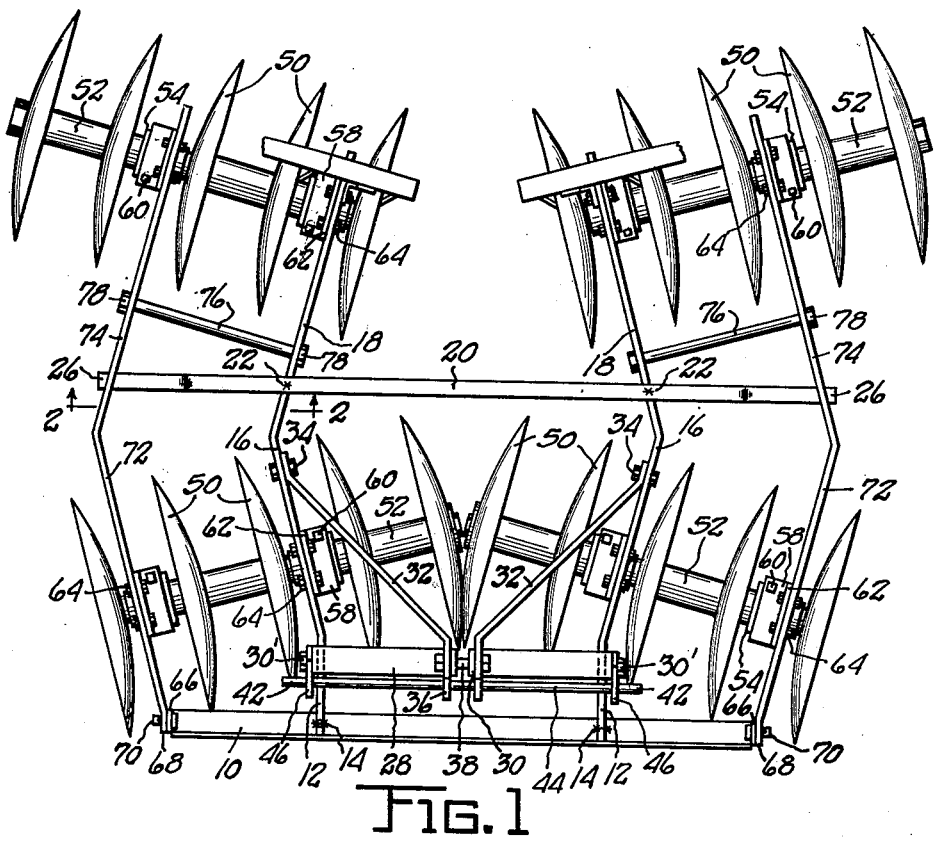
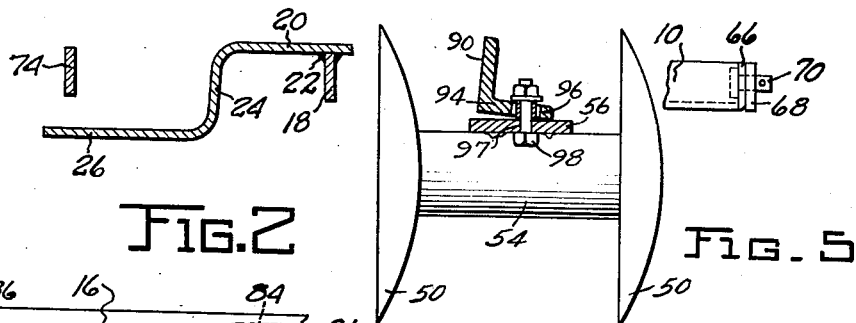
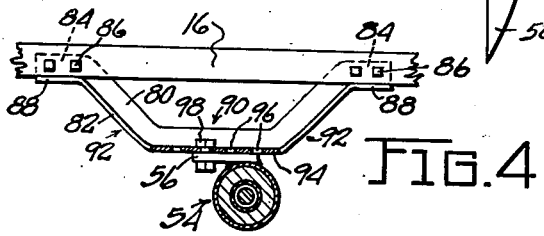
INVENTOR.
JABEZ A. LOVE.
BY
ATTORNEYS.

Patented May 27, 1952

2,598,400

UNITED STATES PATENT OFFICE 2,598,400

LIFT TYPE DISK HARROW

Jabez A. Love, Silver Creek Township,
Cass County, Mich.

Application August 20, 1948, Serial No. 45,403

7 Claims. (Cl. 55—83)

This invention relates to a lift type disk harrow, and more particularly to a tandem disk harrow adapted for connection to a tractive vehicle by means of a power operated lift hitch mounted upon the vehicle.

The primary object of the invention is to provide a harrow which may be lifted bodily to an elevated position above the ground, whose disk blade gangs may be adjusted to different working positions or angles relative to the line of draft of the implement, and whose disk blade gangs are so related to the frame of the implement as to permit them to tilt vertically relative to the implement frame in order to follow the contour of the ground engaged thereby.

A further object is to provide a novel, simple, inexpensive, compact, light weight lift type disk harrow wherein the number of parts is reduced to a minimum.

A further object is to provide a harrow with a rigid frame to which one end portion of each of a plurality of disk blade gangs arranged in tandem relation is connected, a pair of draft members pivoted to the front of said frame about transverse axes and each connected to the free ends of two of the disk blade gangs, and means carried by said rigid frame for limiting downward pivoting of each of said last named members relative to said frame and for preventing lateral deflection or distortion of said draft members.

Other objects will be apparent from the following specification.

In the drawing:

Fig. 1 is a top plan view of the harrow.

Fig. 2 is a detail sectional view taken on line 2—2 of Fig. 1.

Fig. 3 is a front detail view.

Fig. 4 is a detail view illustrating a modified form of the means for mounting or connecting the disk gangs and the frame of the implement.

Fig. 5 is an enlarged fragmentary detail sectional view illustrating the manner in which the gangs are pivotally connected to the frame parts.

Referring to the drawing which illustrates the preferred embodiment of the invention, and particularly to Figs. 1 to 3 thereof, the numeral 10 designates a rigid front transverse frame member, here illustrated as an angle iron but which may be formed of any cross-sectional shape or configuration desired or found suitable. The front end portions 12 of a pair of elongated rigid frame members are welded or otherwise fixedly secured at 14 to the frame member 10 in spaced apart relation and equally spaced from the opposite outer ends of the transverse frame member 10. The longitudinal frame members preferably have rearwardly angularly diverging portions 16 extending from the rear ends of the portions 12 thereof and terminate in rearwardly inwardly converging portions 18. It will be understood, however, that the shape of the longitudinal frame members, including the portions 12, 16 and 18, is illustrative only and not limiting and that the longitudinal frame members may assume any other desired shape found suitable. These longitudinal frame members are here shown as constituting rigid metal bars or plates whose major cross-sectional dimension is positioned vertically, although it will be understood that the cross-sectional shape and configuration of the longitudinal frame members may be of any type found suitable or desirable. A rear rigid transverse frame member 20 is fixedly secured at an intermediate part of the longitudinal frame members 20 by any suitable means, such as welds 22. As here shown the member 20 is welded to the portions 18 of the longitudinal frame members adjacent to the junction of the portions 16 and 18 of said frame members. The member 20 projects laterally outwardly beyond the longitudinal frame members at its ends and is downwardly bent at 24 to terminate in downwardly offset, substantially horizontal terminal portions 26. The members 10 and 20 cooperate with the longitudinal frame members to form a rigid frame unit.

A rigid superstructure is mounted upon the frame unit at the forward end thereof. This superstructure is preferably of the type known in the art as an A-frame and includes rigid upwardly converging bars 28 fixedly secured at their lower ends to the front portions 12 of the longitudinal frame members by the securing members 30', such as nut and bolt units. The upper end portions 30 of the members 28 preferably extend substantially vertically in spaced relation. The members 28 are held in desired upwardly extending position with relation to the rigid frame unit by brace members 32 which are secured at 34 to the longitudinal frame members rearwardly of the point of connection of the members 28 therewith as at a point adjacent the rear end of the portions 16 of said longitudinal frame members. The bracing members 32 extend in forward upwardly converging relation and terminate in end portions 36 which preferably are spaced apart and bear flat against the terminal portions 30 of the members 28. A pin and spacer unit 38 connects the upper terminal portions 30 and 36 of the A-frame parts. The member 38 may provide one connector point for connection of an implement hitch of the type having three connector arms, in which event the upper or compression arm or link of such a hitch will be connected at said member.

Any suitable means for connection of the lower or tension arms of a three-arm lift hitch mechanism may be provided upon the superstructure or the main frame at points spaced below the member 38 and spaced laterally relative to said member and to each other. As here illustrated these lower connector points constitute the terminal portions 42 of an elongated rigid rod 44 which is supported by the free ends of rigid links 46 each pivoted at its opposite end to the main frame as by the securing members 30'. A construction of this character affords flexibility of the connection between the hitch and the implement when the implement is being drawn along the ground by the tractor. Thus this connection permits the longitudinal and lateral tilting of the implement relative to the tractor within predetermined limits. When the implement hitch is operated to lift the implement, a certain amount of lost motion occurs until the tension arms are raised sufficiently to cause the rod 44 to engage the front edges of the superstructure members 28, whereupon further lifting movement is transmitted fully to the implement and the same is raised. While such flexibility is desired, it will be understood that it is not essential in all cases so that the connector parts 42 may be fixedly secured to the implement frame or the superstructure if desired.

A plurality of disk gangs are carried by the frame of the implement and are preferably arranged in tandem as illustrated in Fig. 1. These disk gangs are preferably of the construction illustrated and described in my co-pending application, Serial No. 768,168, filed August 12, 1947. Each of these gangs has a plurality of disk blades 50 mounted concentrically upon a shaft or hub assembly 52 which includes two bearings 54 located at longitudinally spaced points of the gang assembly. The bearings 54 may be of any suitable construction and are preferably provided with a substantially flat plate portion 56 positioned tangentially with respect to the bearing, as best illustrated in Fig. 4. Suitable brackets are employed to connect the bearing plate 56 with the frame. As illustrated in Fig. 1, these brackets comprise L-shaped members or angle irons having a horizontal flange portion 58 adapted to lie flat upon the bearing plate 56 and loosely pivotally connected thereto at one end thereof at 60. The vertical flange 62 of each bracket is fixedly secured to the rigid frame and preferably to one of the longitudinal frame members by the securing members 64. In the form illustrated, the inner bearing of each disk gang is connected to one of the longitudinal frame members by these brackets, the front gangs being secured to the longitudinal frame members at the portion 16, and the rear gangs being secured to the longitudinal frame members at the rear ends of the portions 18 thereof, so that the transverse frame member 20 is positioned between the front and rear gangs. Suitable means may be provided in the longitudinal frame members for altering the position at which the brackets 58, 62 are connected thereto. Thus a plurality of openings or apertures may be provided in the longitudinal frame members, and the securing members 64 of the brackets may be passed through selected ones of these openings.

The opposite ends of the front transverse frame member 10 are provided with end plates 66 positioned vertically and in transverse relation to said member 10. The front end portions 68 of the rigid elongated arms or bars are pivoted to the members 66 as by the pivot pin 70 whose axis extends parallel to the frame member 10. The pivoted arms are preferably bent to conform to the contour of the longitudinal frame members so that the forward end portions 72 thereof diverge rearwardly from the pivot 70 and substantially parallel to the frame member 16, while the rear portions 74 converge rearwardly and inwardly in substantially parallel relation to the frame portions 18. The outer bearing 54 of each of the disk gangs is connected as by the brackets 58, 62 to that one of the outer arms adjacent thereto, it being understood that the outer bearings of the front gangs will be connected to the part 72 of the outer arms, and the outer bearings of the rear disk gangs are connected to the rear ends of the portions 74 of said arms. The pivoted arms pass above the terminal end portions 26 of the rear transverse frame member 20 and, when positioned in the same plane as the longitudinal members of the main or rigid frame, said arms are spaced above said terminal portions 26, as best illustrated in Fig. 2. The transverse pivot axis of the longitudinal arms permits swinging thereof in a vertical plane but the downward swinging movement thereof is limited by the member 26. It will be understood that the pivots 60 between parts 56 and 58 will be loose to permit limited vertical tilting of the gangs without binding.

In order to insure that the pivoted arms will not be deflected or distorted from their desired shape as would result in possible binding thereof or in possible lateral displacement thereof beyond or outwardly of the terminal portions 26 of the transverse frame member, each of said pivoted arms is connected to the adjacent longitudinal frame member by tie rod 76 preferably positioned between the rear disk gang and the transverse frame member, as illustrated. These tie rods fit loosely in receiving apertures formed in the frame parts 18 and the pivoted arm parts 74 so as to accommodate limited vetrical swinging of the pivoted arms with respect to the rigid main frame. The tie rods are provided with enlarged heads 78 at their outer ends which serve to control the spacing of the pivoted arms from the longitudinal frame members at all times.

It will be apparent from the foregoing that a very simple, inexpensive and light weight construction is provided. The number of parts of the harrow is reduced to a minimum, thus insuring light weight. The arrangement also accommodates compactness and reduction to a minimum of the longitudinal dimension of the tractor so that the leverage action thereof upon a tractive vehicle when the harrow is elevated is held to a minimum. The pivoting of the arms to which the outer ends of the disk gangs are connected permits said gangs to shift or tilt vertically to follow the contour of the ground as that contour varies. The tilting of the front disk gangs is limited or small compared to the tilting of the rear disk gangs because of the difference in spacing of the respective gangs from the pivot axis 70. However, this is not objectionable because of the fact that the front gangs will be positioned close to the rear wheels of the tractor or other tractive vehicle and the likelihood of any material change in the inclination of the ground occurring in the short distance between the rear tractor wheels and the front disk gangs is small. The vertical swinging of the arms which accommodates this adjustment of the gangs does not interfere with bodily raising or elevation of the harrow as a unit because of the limitation of such downward swinging movement provided by the underlying position or relation of the terminal portions 26 of the intermediate frame members with respect to said pivoted arms. Adjustment of the gangs with respect to setting of the axis thereof relative to the direction or line of draft of the instrument can be effected at will by simply varying the point along the longitudinal frame members at which the inner bearings of each gang are connected. The same provision for longitudinal adjustment can be provided between the brackets connected to the outer gangs and the pivoted arms to which said brackets are secured. Thus the implement satisfies all requirements of a practical disk harrow and will meet all conditions of use likely to be encountered in operation of such a disk harrow in conjunction with a tractor provided with a lift hitch mechanism.

Unless the vertical flanges 62 of the brackets 58—62 are vertically elongated, the main frame member of the implement will be positioned at a low level and below the uppermost portions of the disk gangs 50. In some instances it may be desired to provide a frame which is positioned at a higher level. This can easily be accomplished with the instant construction by connections between the disk gangs and the frame parts and rigid arms of the type illustrated in Fig. 4. Thus the longitudinal members, whether rigid frame members or the swinging arms, although illustrated in Fig. 4 as being the longitudinal frame member, may have secured thereto a substantially U-shaped bracket or fitting. This bracket or fitting is illustrated in Fig. 4 as constituting an angle iron having one flange 80 thereof positioned in a substantially vertical plane and the other flange 82 thereof projecting laterally from the lower edge of the flange 80. The terminal portions 84 of the flanges 80 are preferably aligned and bear flat against the longitudinal member, such as the frame portion 16 illustrated, and are secured thereto by rivets or other securing means 86. The flange portions 88 of said terminal portions preferably bear against the bottom edges of the frame members to which the same is secured. The bracket is provided with a substantially downwardly offset central portion 90 and downwardly converging portions 92 connecting the terminal portions 84 and said central portion 90. The lower horizontal flange or web 94 of the central portion 90 is preferably provided with a plurality of apertures 96 spaced longitudinally thereof and adapted for attachment to the plate 56 of the disk bearing 54 by suitable loose pivot means 98, such as a bolt and nut unit. Fig. 5 illustrates a construction to accommodate loose pivoting of parts wherein a sleeve 97 encircles the shank of the bolt 98 and fits loosely in one of the apertures 96, said sleeve being of a length greater than the thickness of the member, such as the flange 94, to which the bearing plate 56 is connected. The depth to which the central portion 90 is offset relative to the terminal portions 80 of the bracket will determine the vertical relation of the disk gangs and the frame members, and this offset may be such that the longitudinal frame members and the pivoted arms will be positioned at levels above the upper portion of the disk blades. The construction illustrated in Fig. 4 is illustrative and it will be understood that any other means found suitable or desirable may be employed for the purpose of controlling the elevation at which the main frame is positioned with respect to the blade gangs.

While the harrow has been illustrated and described herein as adapted specifically for attachment to a lift hitch mechanism having three lift arms, it will be understood that it may be adapted readily for attachment to lift hitch mechanisms having only two arms or having more than three arms. In cases where the harrow is to be attached to a two-arm hitch, connection means for the hitch arms may be provided upon the main frame, as at longitudinally spaced points on each of the longitudinal members 12 of the rigid frame, thus eliminating necessity for the A-frame or superstructure. In cases where the lift hitch to which the harrow is to be attached has more than three hitch arms, the same number of connecting means must be provided on the harrow, and the frame and its superstructure must mount or position said means properly to correspond to the position and arrangement of the hitch arms, as will be apparent.

While the preferred embodiment of the invention has been illustrated and described herein, it will be understood that changes may be made therein within the scope of the appended claims without departing from the spirit of the invention.

I claim:

1. A lift type disk harrow comprising a rigid frame unit including a sub-frame and a superstructure, three connectors carried by said frame unit in laterally and vertically spaced relation and adapted for connection with the arms of a lift hitch, a plurality of disk blade gangs arranged in tandem, means connecting each of said gangs adjacent one end thereof to said sub-frame, a pair of rigid elongated arms pivoted to the front of said sub-frame on a transverse axis for vertical swinging movement, means connecting each of said gangs to one of said last named arms in spaced relation to said first named connecting means, and stop means carried by said sub-frame and projecting laterally therefrom to underlie said last named arms for limiting downward swinging of said last named arms.

2. A lift type disk harrow comprising a rigid frame unit including a sub-frame and a superstructure, three connectors carried by said frame unit in laterally and vertically spaced relation and adapted for connection with the arms of a lift hitch, at least one connector being carried by said superstructure, a plurality of disk blade gangs arranged in tandem, means connecting each of said gangs adjacent one end thereof to said sub-frame, a pair of rigid elongated arms pivoted to the front of said sub-frame on a transverse axis for vertical swinging movement, means connecting each of said gangs to one of said last named arms in spaced relation to said first named connecting means, and rigid stop means carried by and projecting laterally from said sub-frame and underlying said last named arms between tandem disk gangs for limiting downward swinging of said last named arms, at least one of the connecting means associated with each gang being adjustable lengthwise of said sub-frame.

3. A lift type disk harrow comprising a rigid frame unit including a sub-frame and a superstructure, three connectors carried by said frame unit in laterally and vertically spaced relation and adapted for connection with the arms of a lift hitch, a plurality of disk blade gangs, means connecting each of said gangs adjacent one end thereof to said sub-frame, a pair of rigid elongated longitudinal arms pivoted to the front of said sub-frame on a transverse axis for vertical swinging movement, means connecting each of said gangs to one of said last named arms in spaced relation to said first named connecting means, and stop means carried by said sub-frame for limiting downward swinging of said last named arms, said sub-frame constituting a plurality of longitudinal members and a plurality of transverse members fixedly secured together, said first named connecting means being secured to said longitudinal members and said last named arms being pivoted to the foremost transverse member, another of said transverse members being located intermediate the length of said frame and including downwardly off-set portions underlying the last named arms to form said stop means.

4. A lift type disk harrow comprising a rigid frame unit including a sub-frame and a superstructure, three connectors carried by said frame unit in laterally and vertically spaced relation and adapted for connection with the arms of a lift hitch, a plurality of disk blade gangs arranged in tandem, means connecting each of said gangs adjacent one end thereof to said sub-frame, a pair of rigid elongated arms pivoted to the front of said sub-frame on a transverse axis for vertical swinging movement, means connecting a pair of said gangs to each of said last named arms in spaced relation to each other and to said first named connecting means, and stop means carried by said sub-frame for limiting downward swinging of said last named arms, and tie rods positioned between adjacent longitudinally spaced gangs each connecting an intermediate portion of one of said last named arms to said sub-frame.

5. A lift type disk harrow comprising a rigid frame unit including a sub-frame and a superstructure, three connectors carried by said frame unit in laterally and vertically spaced relation and adapted for connection with the arms of a lift hitch, a plurality of disk blade gangs, means connecting each of said gangs adjacent one end thereof to said sub-frame, a pair of rigid elongated arms pivoted to the front of said sub-frame on a transverse axis for vertical swinging movement, means connecting each of said gangs to one of said last named arms in spaced relation to said first named connecting means, and stop means carried by said frame for limiting downward swinging of said last named arms, said connecting means each including a bearing forming part of said gang and having a substantially flat portion, a bracket pivoted to said flat bearing portion about a vertical axis, and means fixedly securing said bracket to the part to which said gang is to be connected.

6. A disk harrow adapted to be connected to a lift hitch mounted on a tractive vehicle and including a plurality of hitch elements, comprising a rigid frame including a longitudinal portion and front and rear transverse portions, a plurality of disk gangs arranged in tandem, a pair of elongated rigid arms pivoted to said front frame portion to swing vertically, and means flexibly connecting one end portion of each gang to said longitudinal frame portion and the other end portion to a pivoted arm so that said gangs may tilt as said arms swing, said rear transverse frame members underlying and limiting downward swinging of said arms, and rigid connectors flexibly connecting an intermediate part of each pivoted arm in predetermined laterally spaced relation to said longitudinal frame portion to prevent lateral swinging of said arms.

7. A disk harrow adapted to be connected to a lift hitch mounted on a tractive vehicle and including a plurality of hitch elements, comprising a rigid frame including a longitudinal portion and front and rear transverse portions, a plurality of disk gangs, a pair of elongated rigid arms pivoted to said front frame portion to swing vertically, connectors carried by said longitudinal frame portion for flexibly connecting one end of each gang to said frame, connectors carried by said pivoted arms for flexibly connecting the other end of each gang to an arm, said connectors accommodating vertical tilting of said gangs as said arms swing, at least one connector associated with each gang being adjustable longitudinally on the part which mounts it, said rear transverse frame portions being downwardly off-set at portions underlying said arms to limit downward swinging of said arms.

JABEZ A. LOVE.

REFERENCES CITED

The following references are of record in the file of this patent:

UNITED STATES PATENTS

| Number | Name | Date |
| --- | --- | --- |
| 301,729 | La Dow | July 8, 1884 |
| 2,394,210 | Sherman | Feb. 5, 1946 |